United States Patent [19]
Gleason

[11] 3,978,310
[45] Aug. 31, 1976

[54] MACHINE FOR REPAIR OF CRANKSHAFTS BY WELDING

[76] Inventor: William R. Gleason, 33541 Atlantic Ave., Laguna Niguel, Calif. 92677

[22] Filed: Mar. 10, 1975

[21] Appl. No.: 556,913

[52] U.S. Cl. ................................. 219/124; 219/76
[51] Int. Cl.² ........................................ B23K 9/12
[58] Field of Search ..................... 219/76, 124; 82/9

[56] References Cited
UNITED STATES PATENTS

| | | | |
|---|---|---|---|
| 2,089,421 | 8/1937 | Pierle | 82/9 |
| 2,126,462 | 8/1938 | Groene | 82/9 |
| 3,205,336 | 7/1965 | Smith | 219/76 |
| 3,596,050 | 7/1971 | Tikijian | 219/124 |
| 3,658,232 | 4/1972 | Dill | 219/124 |

Primary Examiner—E. A. Goldberg
Attorney, Agent, or Firm—Forrest J. Lilly

[57] ABSTRACT

There is disclosed a machine for successively applying weld metal to the journals and crankpins of an automotive crankshaft, by rotating the crankshaft on its axis, and employing a means for causing a weld metal feeding torch to follow the crankpin around its circular or planetary path travel, depositing a bead of weld metal on the crankpin. The torch is also translated along the crankpin, and a bead or beads of molten metal is or are then wrapped around the crankpin, preferably in a succession of adjacent circles, and welds thereto. The layer of weld metal thus added is subsequently machined to its proper dimensions.

5 Claims, 13 Drawing Figures

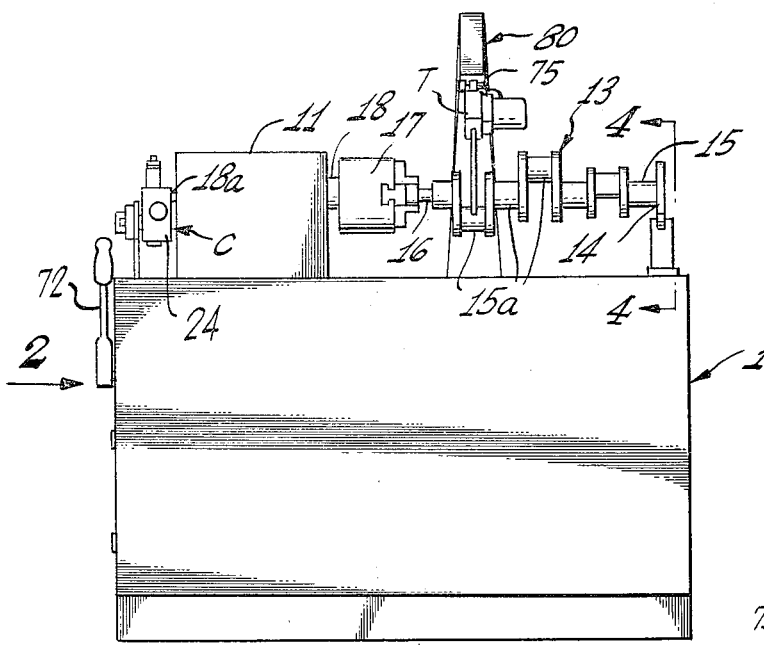
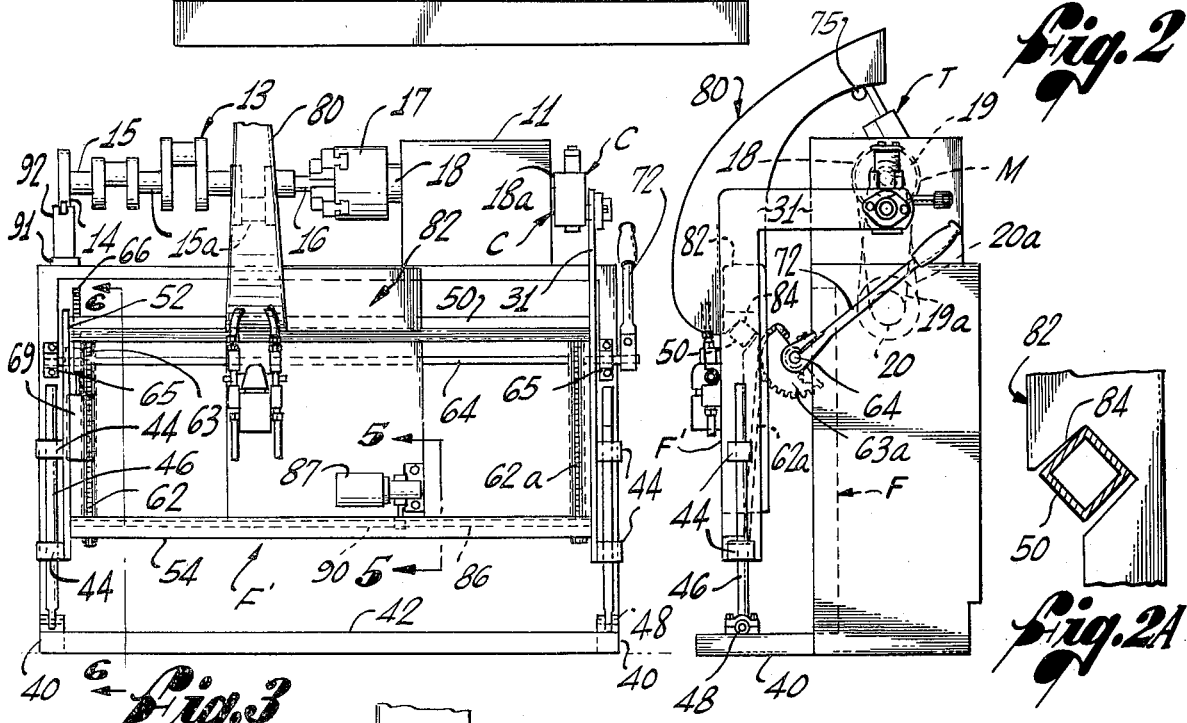
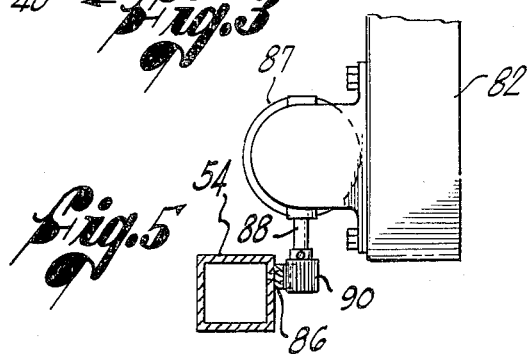
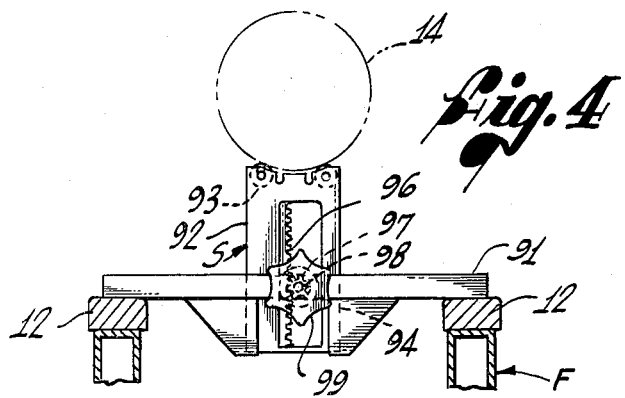

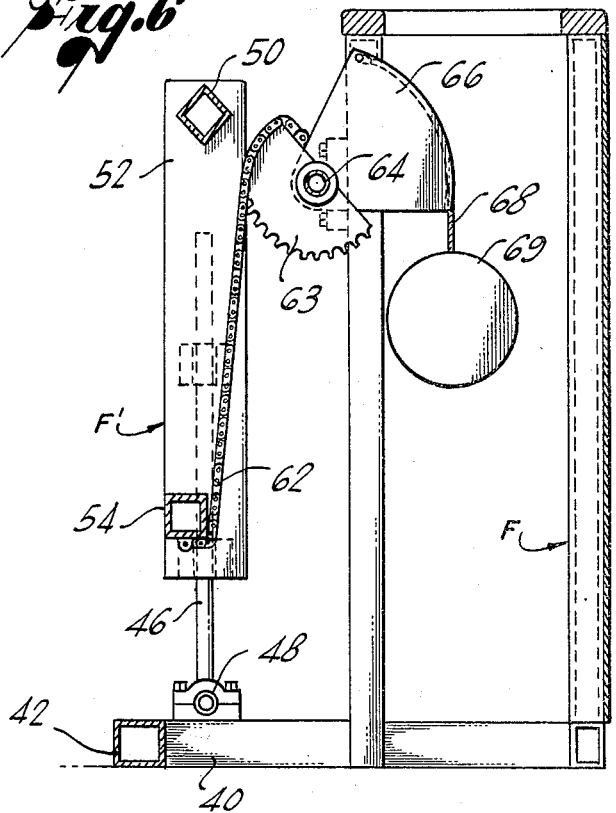
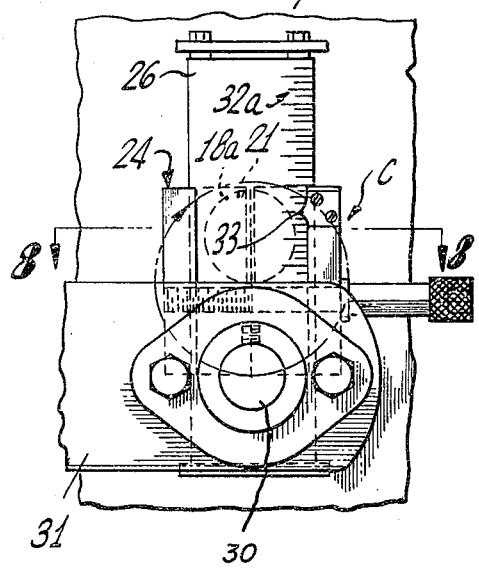
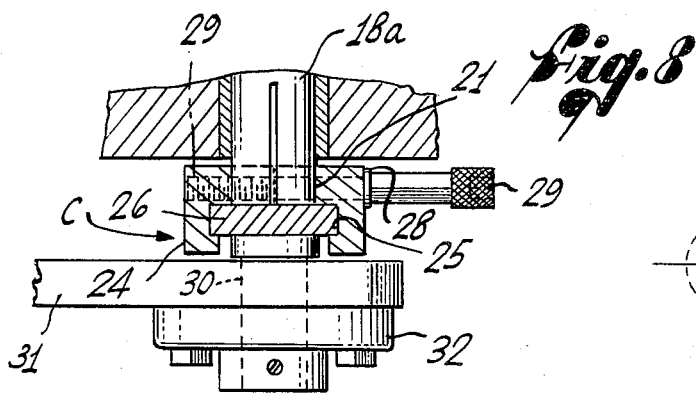
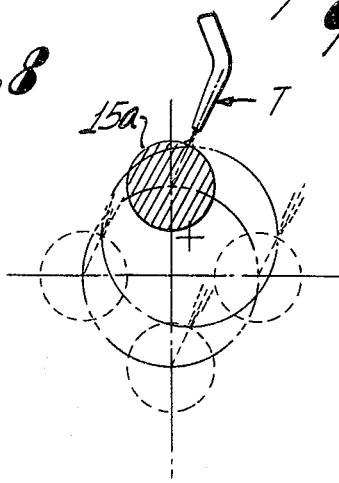
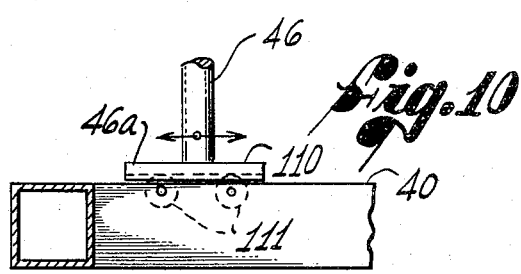

OUT OF ENGAGEMENT WHEN WELDING.

3,978,310

MACHINE FOR REPAIR OF CRANKSHAFTS BY WELDING

FIELD OF THE INVENTION

This invention relates to the art of repairing the crank-pins and journals of automotive crankshafts by addition of weld metal and regrinding.

BACKGROUND OF THE INVENTION

The journals and crankpins of automotive crankshafts are subject to wear and deterioration, and eventually may require repair or replacement. Crankshafts for diesel engines, particularly, are very expensive, and a method of repair or renewal is very attractive alternative to replacement.

In the past, weld metal has been laid down on the journals and crankpins, and the crankshaft then machined to original dimensions. I have in the past supplied, for commercial use, a welding machine which has satisfactorily carried out this process. It involved a means for rotating the entire cranksaft on a longitudinal axis which is centered successively on the crankpins and journals to be renewed. The crank is then rotated about the axis of the selected crankpin, or the journals, and a welding torch held in proximity to the rotating pin or journal turning on this axis while weld metal from the welding torch is supplied, the wedling torch being translated along the crankpin or journal, as the case may be, so that it feeds a bead of weld metal, either spirally, or in a succession of circles, onto and around the pin or journal. The pin or journal is then machined. This welding machine has enjoyed commercial success and has been used by others.

A purpose of the present invention is to provide an improved and simplified machine for the same purpose which can be fabricated far less expensively, which can be set up almost instantaneously for different crankshafts, of different crank throws, as compared with very time-consuming procedures heretofore necessitated, and which, in general, remarkably facilitates the repair procedure.

BRIEF DESCRIPTION OF THE INVENTION

According to the invention, broadly stated, the crankshaft to be repaired is slowly revolved on the axis of its journals. It will be seen that the crankpins actually both rotate on their individual axes, and travel a planetary or orbital circuit about the crankshaft axis, as the crankshaft is rotated, turning once on its individual axis for each planetary circuit. The torch that feeds the molten weld metal is furnished with a linkage by which it is moved cyclically with the travel of the crankpin to follow the latter in its planetary motion, but to stay always just above it, and also to move longitudinally of the crankshaft, either continuously, or step-by-step, so as to lay down on the crankpin a bead of molten metal, either spirally, or in a succession of adjacent circles, in either case with a small degree of mutual encroachment or overlap, as known in the art. The linkage is adjustable to accommodate cranks of different effective arm lengths or "throws", and also to reduce the effective crank arm lengths or throw to zero for purpose of laying metal onto the centered journals.

IN THE DRAWINGS:

FIG. 1 shows a front elevational view in accordance with the invention;

FIG. 2 shows an end elevational view thereof;

FIG. 2A is an enlarged fragmentary sectional view of a portion of the apparatus;

FIG. 3 shows a rear elevational view thereof;

FIG. 4 is a section taken in accordance with line 4—4 on FIG. 1;

FIG. 5 is a detail section taken on line 5—5 on FIG. 3;

FIG. 6 is a view taken in accordance with line 6—6 on FIG. 3;

FIG. 7 is an enlarged elevational detail taken from FIG. 2;

FIG. 8 is a transverse section on line 8—8 of FIG. 7;

FIG. 9 is a diagrammatic view showing a crankpin and associated torch tip in various orbital positions through a cycle of rotation;

FIG. 10 is a detail showing a modification of a portion of FIG. 2;

DESCRIPTION OF AN ILLUSTRATIVE EMBODIMENT

Figure 11:
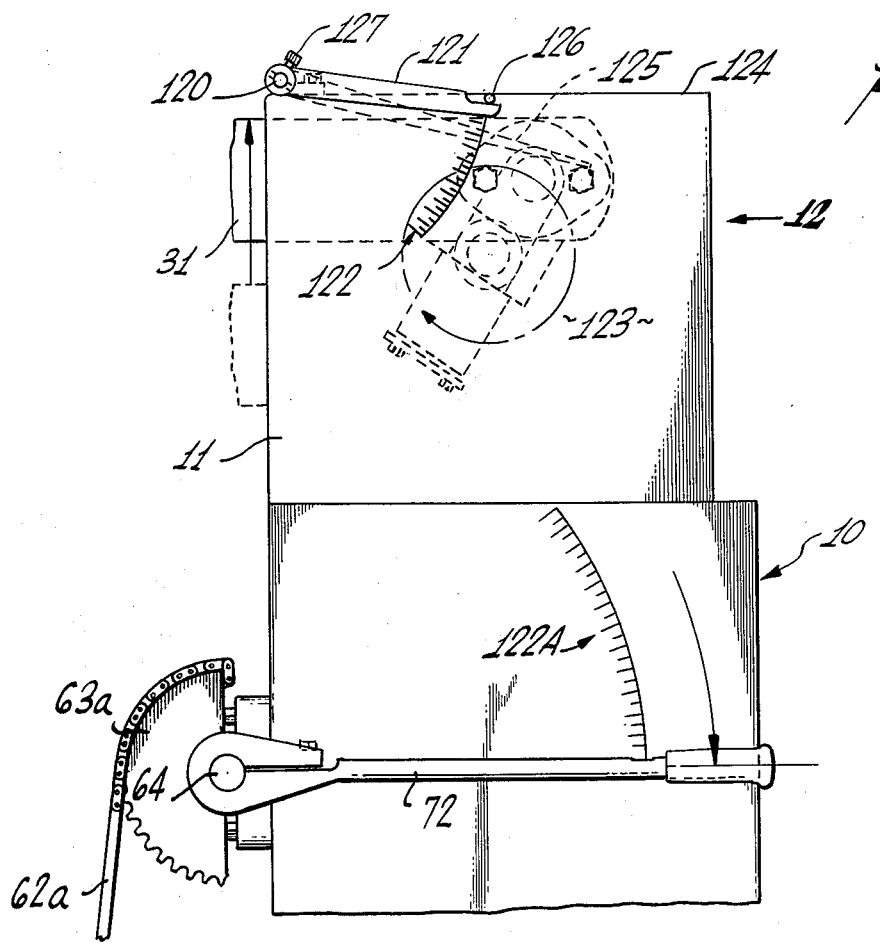
FIG. 11 is a veiw to an enlarged scale showing a portion of a machine generally like that of FIG. 2, but showing a modification.

The machine of the invention has a suitable framework F affording bracing for an upright generally rectangular sheet metal housing 10, the top of which has at one end an elevated housing structure 11 for the power drive, and which affords two parallel rails 12 between and below which is a compartment to catch weld flux. On and between these rails is slidably mounted a vertically adjustable support S for one end of the crankshaft 13, which usually embodies a disk 14 beyond the last journal 15. The crankpins are indicated at 15a. The opposite end of the crankshaft has a reduced stub end or "nose" 16 beyond the corresponding end journal 15, and this is taken by a chuck 17 on the end of a drive shaft 18 supported in bearings (not shown) inside housing structure 11, and driven through a speed reduction chain and sprocket transmission comprised of sprockets 19 and 20 and chains 19a and 20a from a drive motor M, as illustrated. The extremity 18a of the drive shaft projects outside the housing part 11, and has thereon an adjustable crank means C, more particularly described hereinafter. The extremity of shaft 18 is longitudinally split, and is received in a bore 21 defined by the two halves of a longitudinally split guide or guide-way 24, formed with a longitudinal channel 25 for an adjustable crank arm or bar 26.

A shouldered screw 28 projecting through a transverse bore in one side of half of guide-way 24 into an aligned but threaded bore 29 of the opposite side thereof, and clamps the guide-way onto the split shaft, as well as clamping the arm or bar 26 in adjusted position along the guide-way, it being seen that the arm or bar 26 fits slidably in the guide-way when the screw 28 is loosened, but becomes clamped tightly in place when the screw is tightened. The screw 28 preferably has an extension formed with a hexigonal socket 29 for turning by a suitable tool. The arm 26 carries at its extremity (FIGS. 7 and 8) a pivot pin 30 which is journalled in a bearing 32 on the extremity of a link 31, and it will be seen that the center-to-center distance of the crank arm axis and the axis of the connecting pivot pin 30, i.e., the crank arm length can be adjusted readily by the adjusted longitudinal setting of arm 26 in the clamping guide-way 24, guided by a scale 32a on arm 26 and a pointer 33 on guide-way 24. The correct center-to-center distance may be found from published tables, or may be stamped on the crankshaft. In practice, this center-to-center distance is made equal to center-to-center crankshaft throw for welding a crankpin, and is made zero for welding a journal.

Extending rearwardly from the frame F of the machine, at floor level, is a floor-engaging framework comprised of two rearwardly reaching members 40 of box section, extending from opposite ends of the housing 10, and a transverse member 42 between the rearward extremities of members 40.

The aforementioned link 31 reaches rearwardly for a distance from its pivot pin 30, and then extends substantially vertically downward to a termination spaced somewhat upwardly from the aforementioned base framework member 40, all as illustrated. Near its lower end, this link is provided with two vertically spaced vertical guides 44 which slidably receive a shaft 46 extending downwardly to a pivot mounting at 48 on the rearwardly extending floor frame member 40, the axis of the pivot being parallel with that of the crankshaft axis in the machine. Spaced downwardly somewhat from the horizontal reach of the link 31, and connected to said link, is a horizontal transverse bar 50 which extends entirely across the rearward side of the machine to a link 52, which is like the link 31, excepting that it terminates shortly above or at the aforementioned transverse bar 50. It also is slidably arranged relative to an opposite side shaft 46 pivoted on its corresponding frame member 40. near their lower extremities, the links 31 and 52 are connected by a horizontal strut 54. It may now be seen that the rectangular frame structure F' comprised of the members 31, 52, 50 and 54, adapted to be driven orbitally by the pivot pin 30 of the crank arm 26, is constrained to oscillation in a direction transverse to that of a constraining means comprised of the pivotally mounted shafts 46 slidably engaged therewith. Thus this constraining means is oscillatory on and generally laterally to the stationary frame. The oscillatory structure 31, 52, 50 and 54, on the other hand, comprises a motion transmitting means driven by the crank arm 26 in an oscillatory fashion, in a constrained direction generally transverse of the direction of lateral oscillation of the motion constraining means 46. The rectangular frame structure F' together with the torch carriage and other parts to be mentioned presently, is counterbalanced by a chain 62 connected at its lower extremity to the frame member 54, and wrapped at its upper extremity about a sector sprocket 63, the latter being fixed on a transverse rock shaft 64 mounted in pillow blocks 65 secured to the rearward side of the machine as illustrated. Fixed tightly on the shaft 64 is a large inwardly projecting sector plate 66, and suspended from its arcuate edge is a cable 68 supporting a counterweight 69. The cable 69 is connected to sector plate 66, near the upper extremity of the latter, and the counterweight 69 then acts at a constant radius, and therefore exerts a constant counterbalancing force for the frame F¹, together with presently described parts mounted thereon. At the side of the machine opposite from that of the counterweight 69, there is a chain 62a, connected to the corresponding extremity of the frame member 54, and leading upwardly over a sector sprocket 63a, the latter being fixed on the aforementioned rock shaft 64, and its extremity carrying a lever arm 72. This lever arm 72 is used as a manual means to elevate the frame structure just described together with the torch carriage still to be described, while the upward and forward extremity of the link 31 is raised or lowered to adjust the effective arm length of the crank arm C.

The bar 50, mentioned above, is preferably of hollow square cross section, with its sides diagonally oriented to horizontal and vertical, so as to afford at the top a 90° angle fulcrum for a carriage presently to be described.

The welding torch T can be of a dual wire type such as disclosed in my prior U.S. Pat. No. 3,694,620, or one with a single wire. A torch of this type feeds an alloy welding wire progressively forward and out the tip of a nozzle at a predetermined speed, and, as is known, such torches strike an electric arc from the tip of their wire feed nozzle to a part to which they are presented, and from which they are held at a small spacing during operation. The arc progressively melts the welding wire as it is ejected, and the heat of the arc is sufficient that this ejected weld material welds to the part in question, in this case, either a crankpin, or a journal. This welding torch embodying a feed nozzle tapering to a wire ejection tip, and including wire feed means and a drive motor, not shown, is pivotally connected at 75 on the underside of the upper extremity of a large upwardly reaching and forwardly curved support arm 80 mounted on the frame F, particularly on the transverse, diagonally oriented square bar 50. The torch may be provided with any conventional means by which it may also be adjusted vertically relative to arm 80. The arm 80 is preferably of channel section, the channel facing upwardly and rearwardly for the accommodation of certain electric wiring, not necessary here to illustrate. The arm 80 is mounted on a sheet metal, rectangular, generally flat an vertically oriented box-like member 82, the rearward side of which is formed, in its upper end portion, with a hook formation 84 adapted to engage over and be slidable along the aforementioned bar 50. The torch carrying arm 80 together with the box-like frame member 82 constitute a torch carriage, movable longitudinally of the crankshaft, either by hand, or at a predetermined feed rate by gear drive, either continuously for the length of a crankpin, or step-by-step with an indexing distance equal preferably to a little less than bead width as presently described.

As can be seen in the drawings, the throat of the hook is not quite square, but flares somewhat, so that the member 82 can rock through a few degrees of angle on the fulcrum afforded by the upper corner of the bar 50. The arm 80 is so weighted and oriented that it, together with the sheet metal member 82, have their center of gravity located forwardly or towards the crankshaft from the fulcrum bar 50. Accordingly, the lower portion of the sheet metal enclosure 82, below bar 50, is biased to swing rearwardly, The inner side of the lower frame member 59 carries a rack gear 86, and there is mounted on the rearward side of the box member 82 and electric motor 87 formed with a right angle drive to rotate a vertical shaft 88 which carries at its lower end a spur gear 90 normally engaging the rack 86. When it is desired to move the welding torch carriage 82 quickly longitudinally of the machine, it can be rocked rearwardly on its supporting fulcrum bar 50 (FIG. 2A), which disengages the drive pinion 90 from the rack 86, and it may then be slide along the bar 50. When in normal position, with these gears in engagement, and the motor 87 is driven, the carriage comprised of the member 82 together with the arm 80 and the welding torch mounted on the latter, can be driven longitudinally along the bar 50 by the motor 87. This travel causes the welding torch to move along the length of a crankpin or journal in applying the bead of molten weld material thereto. Two ways are known in the art by which this may be done. First, the motor may be operated continuously for the necessary time interval to cause the torch carried thererby to move the necessary distance to feed the bead of molten metal onto the turning crankpin or journal in a spiral manner. Second, the carriage can stand stationary while a circle of weld metal is wrapped around the turning crankpin or journal, and the motor 87 can then be energized just long enough to index the carriage and torch along for a distance preferably a little less than the width of the bead, whereupon the motor is stopped. A succession of circular beads, encroaching on one another to an extent, can thus be laid down on the crankpin or journal for its full length. Both these systems are known in the art in connection with the prior art practices discussed in the introduction hereto. Automatic stop and start mechanism for the motor 87 can be controlled from the drive shaft that imparts rotation to the crankshaft, but is old in the art, forms no part of the present invention, and is therefore not shown. Of course, the torch carriage can obviously be indexed manually.

In operation, the drive shaft and crankshaft are slowly rotated, and the carriage, with its torch arm and torch translated in any of the ways described above in parallelism with the crankshaft axis. The arc is struck from the end of the weld wire at the tip of the nozzle to the top side of a crankpin, proper spacing from the nozzle tip to the crankpin being of course established. Adjustability is required here, since crankshafts have different crank throw distances; and this can be afforded by the pivotal mounting of the torch on the arm, or by adjustment within the torch itself, or of the torch pivot to the support arm, as will be understood. As the crankpin of the rotating crankshaft follows its orbital path, points on the frame F, pivoted at 48, and slowly moved both generally horizontally (about the pivot at 48), and vertically, by the crank arm 26 operating from the main drive shaft, follow a generally similar orbital path, as does the nozzle tip of the torch T. It will be seen that the geometry of the machine is such that the nozzle tip, positioned over and closely adjacent a crankpin, will pursue an orbital path virtually identical to that of the crankpin, and will follow the crankpin around as the crankpin is orbited by the rotation of the crankshaft. Accordingly, the torch tip maintains its operative arcing and wire feeding relationships to the crankpin throughout the virtually identical orbital paths of both. When the bead of weld metal laid down on the crankpin by the travelling torch has been wound about the full length of the crankpin, the operation is interrupted, and the torch re-oriented into a similar orientation with the next crankpin, and so on. When the journals are to be treated, the crank C is adjusted to zero effective crank throw, the torch swung lower to reach the journals, and the journals then wound with molten beads of the weld metal. At such time, the frame F' and arm have no elevating and lowering motion, and no tilting motion, because of the adjustment of the crank arm 26 to zero length.

Various expedients can be used for the support of the disc end of the crankshaft. There is here shown a bar 91 which is supported on the rails 12, and which supports a vertically adjustable carriage 92, here shown as furnished with small rollers 93 adapted to support the end flange of the crankshaft. To accommodate to different crankshafts, the carriage is vertically adjustable, and it is here shown as slidable through a rectangular slot 94 in the bar 91, and movable by means of a rack gear 96 thereon and pinion 97 on a shaft 98 which is mounted for rotation in the bar 91, the shaft having a hand wheel 99, and a jamb nut on the threaded extremity of the shaft being capable of being set up against the bar 91 to secure the adjustment.

In a modification, the frame F' is not pivoted at 48, but provided with linear motion along the frame members 40. In this case, the lower ends of the shafts 46 carry tracks 46a in the form of inverted channels 110 seated in the tops of the rearwardly extending floor frame members 40. The welding torch then does not swing on a long arc centered on the pivots 48, but instead, moves precisely according to the resultant of equal vertical and horizontal components of motion as governed by the throw of the crank arm. Somewhat better uniformity of application of weld metal onto the crankpins is thereby gained.

Figure 12:
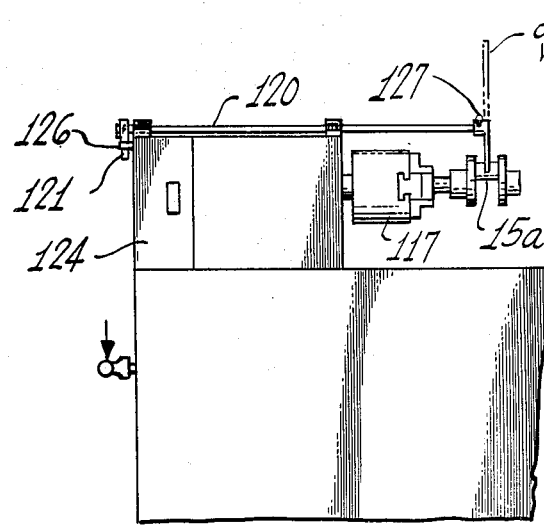
FIG. 12 is an elevational view looking at the machine of FIG. 11 from the right, in the direction of the arrow 12 on FIG. 11.

The present invention very greatly facilitates setting up for the crank throw distance of the crankshaft. One scheme, a scale and pointer, has already been described. FIGS. 11 and 12 show an improvement. The machine of FIGS. 11 and 12 may be the same as shown in FIGS. 1–10, but with some added parts as will now be described.

The rock shaft 120 is mounted for rocking movement on the back of housing part 11, in parallelism with the crankshaft axis. Tight on one end of this crankshaft is a pointer 121, moving along an arcuate scale 122 placed on the end wall 123 of a housing end cover 124, not shown in FIGS. 1–10, but understood to cover the components shown in elevation in FIG. 2. This pointer 121 strikes a stop pin 126 when it has been moved up to a nearly horizontal position, where it then points to the top end of the scale 122.

A measuring arm 125 is slidable along the shaft 120, and has a thumb set screw in its hub as at 127, to frictionally clamp it onto the shaft 120 opposite the end crankpin 15a. It is clamped only relatively loosely or yieldingly on the shaft, so there can be relative rotation between the shaft and the pointer, yieldingly resisted by the screw 127 depending upon its setting and resulting frictional bind.

Assume a crankshaft of unknown throw in the machine, and that it is being rotated, so that one of its cranks is rising in clockwise rotation as viewed in FIG. 11. Assume that pointer 121 has been positioned against stop pin 126, and that the crankpin 15a with which the measuring arm 125 is aligned has been engaged and is being lifted thereby. This rising arm 125 will turn against frictional resistance on the rock shaft, until the crankpin has become elevated to its maximum height (top dead center) and the arm 125 has also been elevated to its maximum height. Then, as the crankpin goes over beyond top dead center, and beings to lower, the measuring arm 125, and also the pointer 121, will lower together at a fixed angle, by their weight, and the frictional resistance against relative rotation thereof, the weight of the assembly being borne by the descending crankpin. Continuing on, the measuring arm 125 continues to ride the now descending crankpin to the bottom; and the distance the pointer 121 moves down the arcuate scale 122 as this bottom position is reached will evidently be an accurate measure, in scale divisions, of the effective length of the crank arm carrying the crankpin 15a. This crank arm length can be read in arbitrary units on the scale 122.

It is now necessary to adjust the so measured effective length of the crank of the crankshaft into the machine, i.e., to adjust the effective length of the crank arm 26 by adjusting its position in the guide-way 24. To do this easily, a replica 122A of the arcuate scale 122, to a different enlarged scale, if desired, is inscribed or imprinted on the end of the housing 10, in a position correlated with the lever arm 72. This scale 122A is calibrated in units proportional to those of the arcuate scale 122.

Note now that the distance measured downwardly by pointer 121 on scale 122 from the upper end thereof, decreases with shorter crank arm lengths. Note also that the distance moved downwardly by lever 72 along scale 122A (crank arm 26 being unclamped from guide 24), corresponds with a repositioning of crank arm 26 to shorter effective length of the crank arm. The unit marks on scales 122 and 122A being proportional, a reading taken downwardly off scale 122, as above described, can be used on scale 122A to guide the angle of deflection to be imparted to lever 72, in a clockwise direction on scale 122A, in order to elevate the link 31 the exact amount to equalize the throw of the crank arm 26 with the throw of the crankshaft's crankpin 15A. The adjustment is made with the crank in question hanging vertically downward, and the crank arm 26 loosened in its guide-way 24. With the link 31 held in this adjusted position by means of the lever 72, the guideway is re-tightened (by a wrench applied to the clamping screw through a window in the cover, FIG. 12).

Thus, by this means, the machine can be set up in a few moments for a crankshaft of unknown effective crank arm length.

What is claimed is:

1. In a welding machine for feeding and fusing a bead of molten arc weld metal to and around crankpins and journals of automotive crankshafts, said crankshafts having journals whose centers are on its longitudinal axis and crankpins offset from said longitudinal axis by center-to-center offset distances which differ with different crankshafts, the combination of:
   a stationary frame;
   a rotatable power driven drive shaft journalled in said frame;
   means for supporting the crankshaft for rotation on its longitudinal axis and for coupling it to said drive shaft to rotate synchronously therewith, whereby its crank pins describe orbital paths, and its journals turn concentrically about the longitudinal crankshaft axis;
   an electric arc welding torch embodying a welding wire feed nozzle terminating in an outlet tip;
   a motion constraining means oscillatory on and laterally to said stationary frame,
   an oscillatory motion transmitting means reciprocable on said oscillatory motion constraining means in a direction generally transverse to the direction of lateral oscillation of said motion constraining means,
   a crank arm rotatable with said drive shaft and pivotally connected to said oscillatory motion transmitting means,
   a carriage for said torch supported on said motion transmitting means and progressively movable thereon in a direction parallel with the longitudinal axis of a crankshaft supported by said crankshaft supporting means, to align the tip of said torch with a selected crank pin or journal of said crankshaft,
   a torch support arm on said carriage for adjustably positioning and holding said torch with the nozzle tip thereof selectively in wire feeding and arcing proximity to a selected crank pin or journal of said crankshaft, and
   means for adjusting the effective length of said crank arm in a range of lengths, including zero length, whereby the nozzle tip of said torch describes an orbital path of adjusted radius to maintain its wire feeding and arcing proximity to the selected crank pin throughout the orbital travel of the latter about said longitudinal axis, or, with the crank arm adjusted to zero length, to a selected crankshaft journal.

2. The welding machine according to claim 1, wherein said machine is oriented with said crankshaft supported in a horizontal position, and including means supported by said stationary frame for counterbalancing said oscillatory motion transmitting means and carriage.

3. The welding machine according to claim 1, wherein said motion constraining means includes guide shafts pivotally mounted at lower ends thereof on said stationary frame on a pivot axis parallel to the crankshaft, said shafts being slidably received by substantially vertically oriented guides on said oscillating frame.

4. The welding machine according to claim 1, wherein said motion constraining means comprises means vertically slidable associated with said oscillatory torch drive means and affording therewith a horizontal trackway and roller combination, whereby the oscillatory torch drive means has horizontal and vertical components of movement in quadrature relative to the stationary frame whereby to impart circular orbital motion to the nozzle tip of the torch.

5. The combination according to claim 1, wherein said drive shaft is coaxial with said crankshaft, and said drive shaft is horizontally disposed;
   and including:
   a rock shaft mounted on said frame in parallelism with the crankshaft axis;
   a measuring arm mounted with a yieldable friction fit on said frame and positioned opposite a crank pin of said crankshaft, so as to be capable of swinging down on said shaft to engage said crank pin,
   a pointer arm fixed on said shaft;
   a stop fixed relative to the frame adapted to limit upward movement of said pointer arm;
   an arcuate scale fixed relative to said frame extending along the downward arc traveled by the extremity of said pointer as said pointer swings downward from said stop;
   a lever arm pivoted on said frame on an axis parallel to the crankshaft axis and operatively connected to said carriage to move it vertically; and
   an arcuate scale for said lever arm on said frame, there being correlated indicia on said scales whereby indications of pointer position on the first-mentioned scale are represented by corresponding, proportionately related indications on the second-mentioned scale, whereby the second-mentioned scale indicator positions for said lever arm at which the adjustable length crank arm may be set to a distance equal to the effective length of the crank arm of the crankshaft.

* * * * *